United States Patent
Kobman et al.

[11] Patent Number: 5,925,962
[45] Date of Patent: Jul. 20, 1999

[54] ELECTRIC MOTOR COMMUTATOR

[75] Inventors: Richard L. Kobman, Cass City; Michael L. Mercer, Mayville, both of Mich.; Dirk G. Westendorf, Elkhart, Ind.; Arthur J. Birchenough, Berea, Ohio; James A. George, Middleburg Hts., Ohio; Marc B. Ruprecht, North Olmstead, Ohio; J. D. Tuckey, deceased, late of Cass City, Mich., by Dolores Tuckey, executrix and trustee

[73] Assignee: Walbro Corporation, Cass City, Mich.

[21] Appl. No.: 09/072,933

[22] Filed: May 5, 1998

Related U.S. Application Data

[63] Continuation-in-part of application No. 08/574,727, Dec. 19, 1995, Pat. No. 5,793,140.

[51] Int. Cl.⁶ .................................................. H01R 39/06
[52] U.S. Cl. ...................... 310/237; 310/233; 310/236; 310/67 R; 310/44; 310/45; 29/597
[58] Field of Search ........................... 310/231, 235, 310/236, 237; 29/597

[56] References Cited

U.S. PATENT DOCUMENTS

| | | | |
|---|---|---|---|
| 4,453,102 | 6/1984 | Sawabe et al. | 310/237 |
| 4,596,519 | 6/1986 | Tuckey | 418/15 |
| 4,948,346 | 8/1990 | Tuckey | 417/312 |
| 5,013,221 | 5/1991 | Tuckey | 417/365 |
| 5,157,299 | 10/1992 | Gerlach | 310/237 |
| 5,175,463 | 12/1992 | Farago et al. | 310/237 |
| 5,245,240 | 9/1993 | Takasaki | 310/237 |
| 5,255,426 | 10/1993 | Farago et al. | 29/597 |
| 5,386,167 | 1/1995 | Strobi | 310/237 |
| 5,400,496 | 3/1995 | Kemmer et al. | 29/597 |
| 5,442,849 | 8/1995 | Strobl | 29/597 |
| 5,530,311 | 6/1996 | Ziegler | 310/237 |
| 5,552,652 | 9/1996 | Shimoyama et al. | 310/237 |
| 5,637,944 | 6/1997 | Shimoyama | 310/237 |
| 5,677,588 | 10/1997 | Strobl | 310/237 |

FOREIGN PATENT DOCUMENTS

| | | | |
|---|---|---|---|
| 0529911 | 3/1993 | European Pat. Off. | 310/233 |
| 44457596 | 6/1995 | Germany . | |
| 08308183 | 11/1996 | Japan . | |
| 8308183 | 11/1996 | Japan | 310/233 |
| 1067963 | 5/1967 | United Kingdom | 310/233 |
| 2032196 | 4/1980 | United Kingdom | 310/233 |

*Primary Examiner*—Elvin G. Enad
*Attorney, Agent, or Firm*—Barnes, Kisselle, Raisch, Choate, Whittemore & Hulbert, P.C.

[57] ABSTRACT

A flat commutator for an electric motor of a vehicle fuel pump. The commutator, is made with a one-piece carbon ring having a flat outer face, a one-piece conductor ring underlying the outer face of and embedded in the carbon ring, and a housing of a plastic insulating material molded on the rear face and the inner and outer edges of the carbon ring and adapted to mount the commutator on a motor armature. A plurality of circumferentially spaced apart grooves extend radially and axially completely through both the carbon ring and the conductor ring to provide a plurality of individual sintered carbon segments each with a separate conductor for electrically connecting the segments with armature coils.

16 Claims, 4 Drawing Sheets

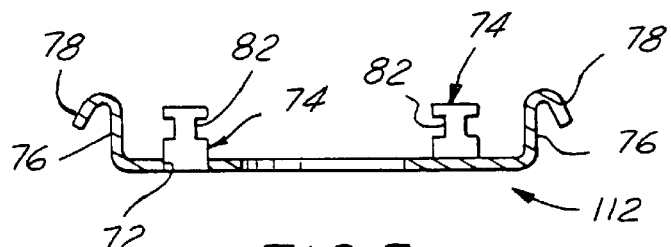
FIG. 5
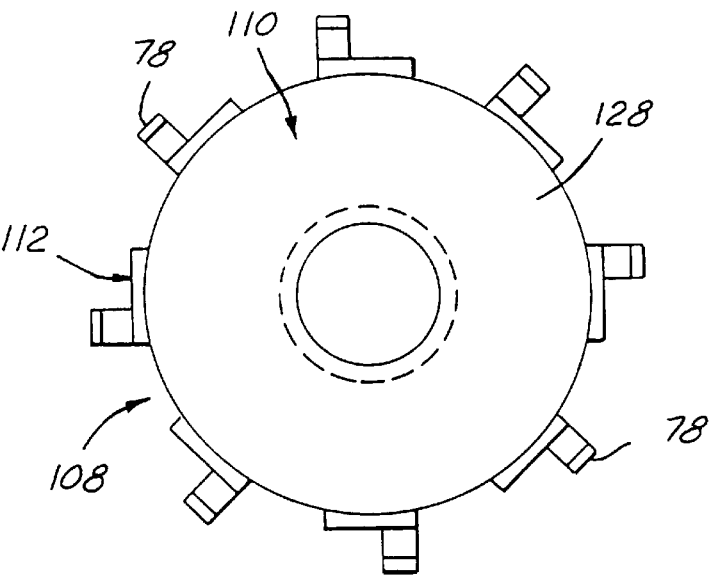
FIG. 6
FIG. 7
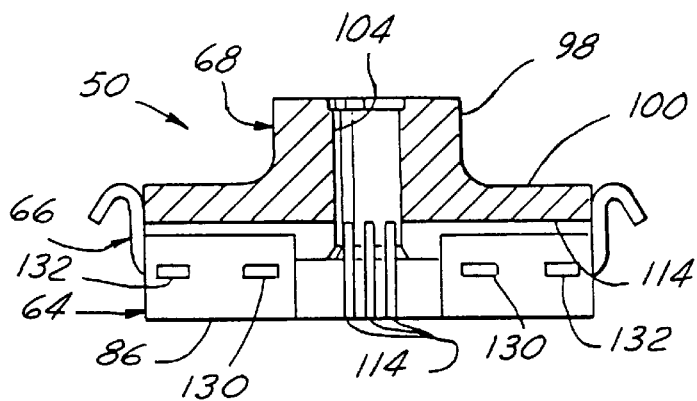
FIG. 8

5,925,962

ELECTRIC MOTOR COMMUTATOR

REFERENCE TO A COPENDING APPLICATION

This is a continuation in part of copending U.S. patent application Ser. No. 08/574,727, filed on Dec. 19, 1995 and issued as U.S. Pat. No. 5,793,140 on Aug. 11, 1998.

FIELD OF THE INVENTION

This invention relates to electric motors, and more particularly to a flat commutator for an electric motor of a fuel pump, which is immersed in fuel, and a method of making it.

BACKGROUND OF THE INVENTION

Electric fuel pumps disposed in a fuel tank of an automotive vehicle with a motor armature and commutator in contact with liquid fuel have been previously used. One such fuel pump with an electric motor having a flat commutator perpendicular to the axis of rotation of the armature and with brushes generally parallel to the armature is disclosed in U.S. Pat. No. 5,013,221 issued on May 7, 1991. Various flat commutator constructions and methods of making them have been previously used. U.S. Pat. No. 5,157,299 issued on Oct. 20, 1992 discloses a method and commutator in which circumferentially spaced apart separate carbon segments and underlying metal conductor/supports are received on a hub of a molded insulating plastic material with the plastic material received between the confronting side edges of adjacent metal conductor/supports to protect them from contact with liquid fuel which results in corrosion of the metal conductor/supports and degradation of the commutator when in service.

U.S. Pat. No. 5,386,167 to Strobl of Johnson Electric S.A. discloses a planar carbon segment commutator on a base member of an insulating material. The base member has a front surface extending, at least in part, transversely to its rotational axis. Apertures extend rearwardly from the front surface and circumferentially spaced, independent contact members are individually mounted on the front surface. Each of the contact members has integral locking means which extend rearwardly into apertures in the front surface. Carbon segments are molded over the contact members so that each segment has integral anchor means, which extend rearwardly into the apertures in the front surface, by injecting a mixture of carbon powder and carrier material into the space between the base member and the mold. The patent states that any known carrier material, such as phenolic resin, may be used with the carbon powder to form the moldable mixture (column 2, lines 49–55).

The Strobl patent also says that subsequent heat treatment will depend on the operating requirements of different commutators, in accordance with known technology which forms no part of his invention. It is apparent, however, that subsequent heat treatments such as sintering will be restricted to temperatures far below those that would be optimal for the production of molded carbon articles such as carbon commutator segments in order to avoid degradation of the material in the insulating base member. Carbon powder mixtures such as those employed in this invention, and apparently in Strobl's, are typically sintered at temperatures of at least 1,000° F., preferably at temperatures of about 1400° F. to 1500° F. Neither materials such as the phenolic resins conventionally used for commutator base members nor other known insulating materials that might be suitable for these structures will withstand these temperatures.

SUMMARY OF THE INVENTION

A method and flat face commutator in which a continuous ring of an electrically conductive metal is electrically connected and mechanically attached to a sintering carbon ring and then a housing of an electrically insulating plastic material is molded onto this subassembly. The sintered carbon ring is formed before the electrically insulating plastic material is molded on to the subassembly. Thus, applicants are not limited to sintering temperatures and times that are low enough and brief enough to avoid degradation of the plastic material.

After the housing has been molded on the subassembly, a plurality of circumferentially spaced apart radial grooves are cut through both the carbon ring and the metal ring to provide a commutator with a plurality of individual carbon segments permanently mounted and attached to the housing and each having a separate electrical connector adjacent the periphery of the housing. Preferably, the metal ring is constructed so that after the radial grooves are formed only a small area of the metal is exposed in the groove. Preferably, the metal and carbon rings are electrically and mechanically interconnected by forming a green powdered carbon compact around the metal ring and sintering the carbon to bond them together. In one form, the metal ring has upstanding prongs to anchor the metal ring in the carbon ring and in another form, through holes in the metal ring receive a portion of the carbon ring material therethrough to anchor the metal ring within the carbon ring.

Objects, features and advantages of this invention include a method and flat commutator which has a long useful life when exposed to hydrocarbon fuels, desirable low electrical resistance, high mechanical strength and stability, minimizes machining, eliminates cleaning of solder and plating of carbon ring, a relatively simple design and is extremely inexpensive and economical to manufacture and assemble, rugged, durable, reliable, and has a long useful life in service.

BRIEF DESCRIPTION OF DRAWINGS

These and other objects, features and advantages of this invention will be apparent from the following detailed description of the preferred embodiments and best mode, appended claims, and accompanying drawings in which:

FIG. 5 is a sectional view taken generally on line 5–5 of FIG. 4 of the conductor ring;

FIG. 6 is an end view of a sintered carbon ring and conductor ring subassembly used in making the commutator of FIG. 1;

FIG. 7 is a sectional view taken generally on line 7—7 of FIG. 6;

FIG. 8 is a sectional view of the commutator taken generally on line 8—8 of FIG. 3;

DETAILED DESCRIPTION

Figure 1:
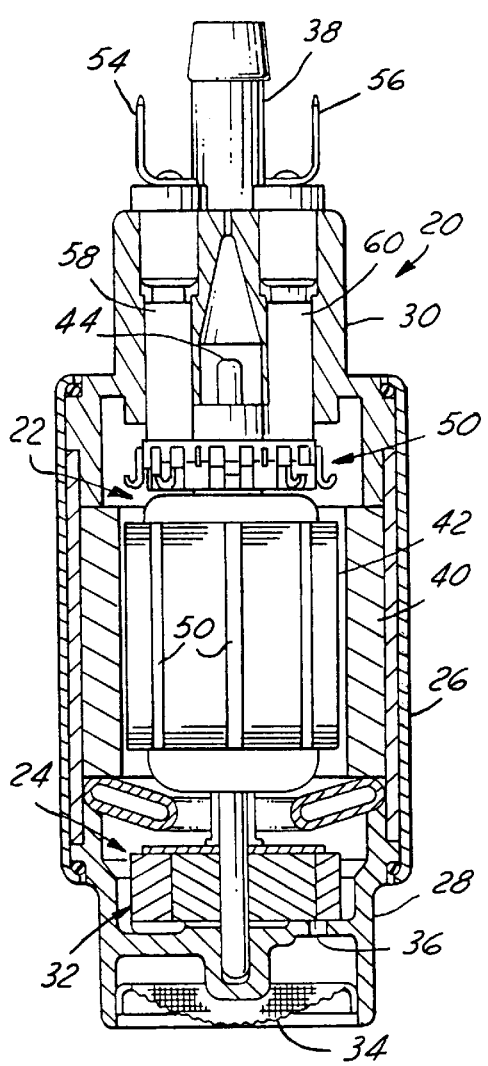
FIG. 1 is a longitudinal sectional view of a fuel pump with a first commutator embodying this invention.

FIG. 1 illustrates an electric fuel pump module 20 for an automotive vehicle which is typically mounted in a fuel tank. The module 20 has an electric motor 22 and a fuel pump 24 mounted in a case 26 and received between a fuel inlet end cap 28 and fuel outlet end cap 30. The pump has a gear and rotor assembly 32 which draws fuel from the tank through a filter 34 and an inlet port 36 and discharges fuel under pressure into the casing and through an outlet 38. The motor 22 has a permanent magnet stator 40 and an armature or rotor 42 with a mounting and drive shaft 44 and a flat commutator 50 thereon embodying this invention. To energize the motor, current is supplied to coils 52 of the armature 42 through terminals 54, 56 electrically connected to brushes 58, 60 yieldably biased by springs into engagement with an end face of the commutator 50. As thus far generally described the pump module 20 is disclosed in U.S. Pat. Nos. 5,013,221; 4,948,346; and 4,596,519, the disclosures of which are incorporated herein by reference and hence the pump module will not be described in greater detail.

Figure 2:
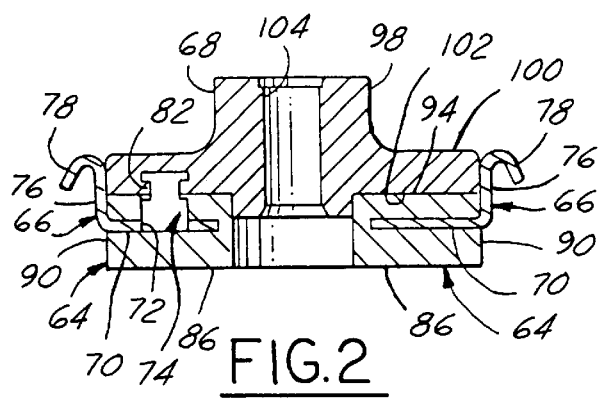
FIG. 2 is an enlarged sectional view of the commutator of FIG. 1.
Figure 3:
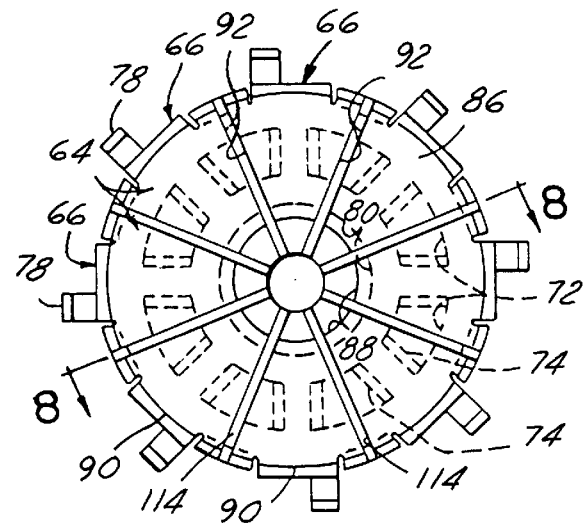
FIG. 3 is an enlarged end view of the commutator of FIG. 1.

As shown in FIGS. 1–3, the commutator 50 has a circumferential array of a plurality of individual sintered carbon segments 64 each with a conductor 66 embedded therein and mounted on a housing 68. Each conductor has a generally planar base plate 70 with openings 72. A generally I-shaped anchor 71 with integral upstanding attachment prongs 74 extends from the side of each base plate 70. An integral upstanding tang 76 terminating in a generally U-shape hook 78 for connecting an armature coil lead wire extends from the radially outer edge of each base plate 70. Preferably, the tangs 76 bear on the periphery of the carbon segments 64 and the inner edge 80 of each conductor terminates within its associated carbon segment 64. Preferably, each attachment prong 74 has a generally T shape with a head formed by a pair of generally opposed notches 82.

Each carbon segment 64 has a generally pie or trapezoidal shape with a planar outer face 86 providing a brush contact surface and is formed of sintered powdered carbon and a suitable binder with one conductor 66 embedded therein. Preferably, each segment has arcuate inner and outer walls 88, 90, planar side walls 92, and preferably a planar bottom wall 94. The conductor I-shaped base 70 with notches 72, and the upstanding prongs 74, mechanically interlock and electrically connect each sintered carbon segment with its associated conductor 66.

The housing 68 has a central hub 98 and an integral flange 100 with a shoulder 102 on which each carbon segment 64 is received and supported. The hub has a through bore 104 coaxial with the carbon segments which, when the commutator is assembled on the armature 42, is telescoped over and generally coaxial with the armature shaft 44. The mounting prongs 74 of each conductor are embedded in the housing to fixedly secure and lock its carbon segment and associated conductor thereon. The housing 68 is made of a moldable plastic electric insulating material, such as a phenolic resin.

In accordance with the method of this invention, the commutator 50 is made by forming a subassembly 108 of a one-piece sintered carbon ring 110 (FIG. 6) with a one-piece conductor ring 112 embedded therein, molding the housing 68 onto the subassembly of the carbon ring with the conductor ring embedded therein, and then cutting a plurality of equally circumferentially spaced radial grooves 114 completely through the carbon and conductor rings to form the individual sintered carbon segments 64 with one conductor 66 therein with each segment and its conductor permanently fixed to the housing.

Figure 4:
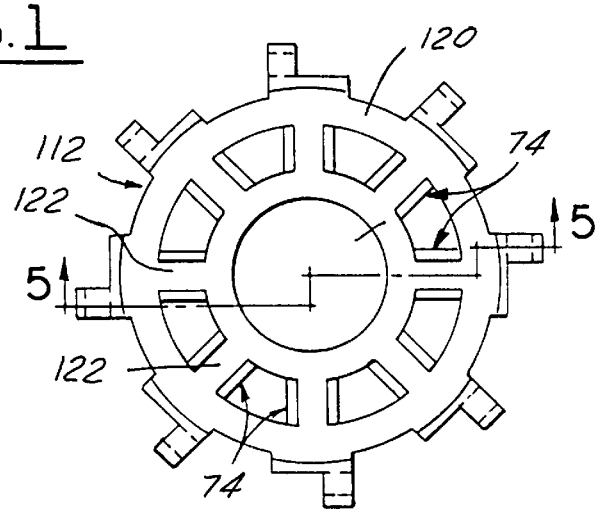
FIG. 4 is an end view of a conductor ring utilized in making the commutator of FIG. 1.

As shown in FIGS. 4 and 5, the conductor ring 112 is a one-piece stamping of a highly conductive metal, such as beryllium-copper alloy C 17400 and copper alloy C 19400 (as specified by the Copper Development Association), with concentric inner and outer annular portions 118, 120 interconnected by radial spokes 122 with upturned integral prongs 74 with notches 82 therein. A plurality of equally circumferentially spaced integral tangs 76 with return bend hooks 78 are also formed on the periphery of to the outer annular portion 120. The conductor 112 ring may be formed from a blank of copper sheet metal by conventional slitting, punching, bending, coining and stamping methods, operations, and equipment and hence will not be described in further detail.

The one-piece carbon ring 110 with the conductor ring 112 embedded therein is made by molding under pressure a compact of powdered carbon material and binder around a conductor ring. For the fuel pump motor discussed above, the carbon material and binder should produce a carbon ring 110 that is strong, has low electrical resistance, and is resistant to degradation by hydrocarbon fuels. Various commercial molding materials and binders conventionally used to produce sintered carbon products such as brushes for electric motors are suitable. The carbon material is preferably graphitic in nature. Material that is predominately natural graphite having a high purity, or low ash content, and a high crystalline level is especially preferred.

The binder material is typically a thermoset resin (preferably a phenolformaldehyde) which can be carbonized during sintering to make the resin more electrically conductive (thereby improving the conductivity of the carbon ring), make the ring more durable, and make it less susceptible to degradation by the hydrocarbon fuels for which these commutators are designed. The binder may constitute about 5% to about 30% by weight of the carbon-binder mixture. With lower quantities of binder, the mixture may not be coherent enough to remain intact during the molding and sintering processes. Higher amounts of binder lead to increased shrinkage during sintering. Carbon rings with higher amounts of carbonized binder also tend to be less conductive and, because the carbonized resin is not converted to graphite, tend to have a higher coefficient of friction.

The carbon material and binder are placed in a die along with the conductor ring 112 and pressed by a force of about 5 to 20 tons/sq. in. to form a green compact. The green compact is then sintered, typically at a temperature of at least 1,000° F. and preferably at a temperature of about 1,400° F. to 1,500° F. to form the sintered carbon ring with the conductor ring fixed therein and electrically connected with the sintered carbon ring. Preferably, to avoid cracking or crazing of the sintered carbon, the temperature is raised gradually to the sintering temperature, which is believed to both dehydrate the powdered carbon and binder mixture and avoid heat shock, which might occur if the green carbon compact was rapidly heated. Sintering is preferably conducted in a controlled atmosphere to avoid oxidation of the conductor ring 112.

The housing 68 is then formed on the back side of the sintered carbon ring 110 with the conductor ring 112 embedded therein by injection molding in a suitable die under heat and pressure an electrically insulating plastic material, such as a fiberglass-filled phenolic resin. The molding resin also needs to be highly resistant to degradation and deterioration by immersion in the fuel with which the electric pump is used, such as gasoline, gasohol, or diesel fuel. The housing is formed by conventional plastic molding equipment, methods and operations and hence the making of the housing will not be described in further detail.

After the housing 68 is molded on the carbon and conductor ring subassembly, the outer face 128 of the sintered carbon ring 110 can be turned, ground or otherwise machined, if necessary, to provide a planar brush contact surface and then the plurality of radial grooves 114 are cut completely through both the sintered carbon ring 110 and the conductor ring 112 to form the individual carbon segments 64 each with a separate conductor 66 embedded therein. As shown in FIG. 8, each groove 114 has a sufficient axial depth to cut completely through both the carbon and conductor rings and penetrate slightly into the housing to insure each carbon segment is electrically isolated from adjacent segments.

As shown in FIG. 8, most of the base plate 70 of each conductor 66 is encapsulated by its associated carbon segment and within each groove 114 only a small area of the cross members 130, 132 of the plate formed by the annular portions 118, 120 of the conductor ring is exposed in use to contact by liquid fuel in the pump. The radial extent of each conductor 66 exposed in the groove 114 is desirably less than one-half and preferably less than one-third of the radial extent of the groove through the carbon ring. In the groove 114, the exposed surface area of the conductor is desirably less than one-third and preferably less than one-sixth of the surface area of its associated carbon segment in the groove. This greatly reduces the tendency of corrosion of the conductor and the buildup in the grooves of conductive deposits between adjacent segments 64 in use and thereby greatly increases the useful service life of the commutator.

The completed commutator is assembled on the motor armature, preferably by press fitting the hub bore 104 over the shaft 44 of the armature 42 so that the commutator 50 is coaxially aligned with the armature and secured thereon for rotation in unison therewith. The lead wires for each armature coil 52 are connected and soldered to the hooks 78 of the conductors 66 of the segments 64 for supplying electric power through the brushes and segments to the coils of the armature. In use, to rotate the armature, an electric current is applied to the armature coils 52 through the brushes 58, 60, which are yieldably biased into engagement with the flat face 86 of the segments 64 of the commutator 50.

Figure 9:
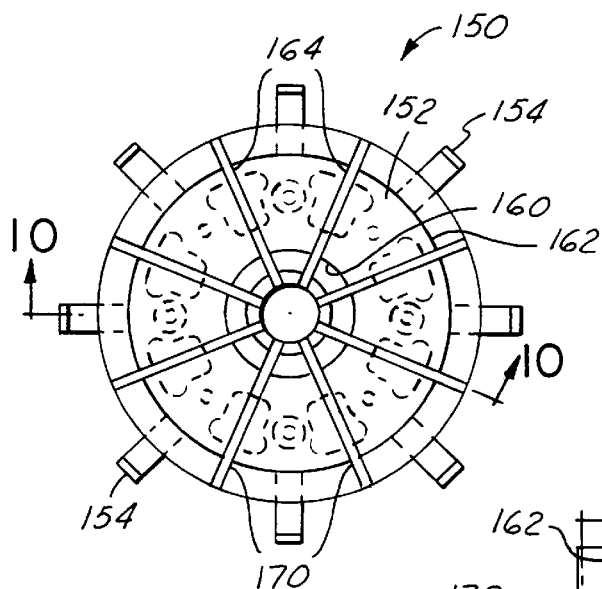
FIG. 9 is an end view of a modified commutator.
Figure 10:
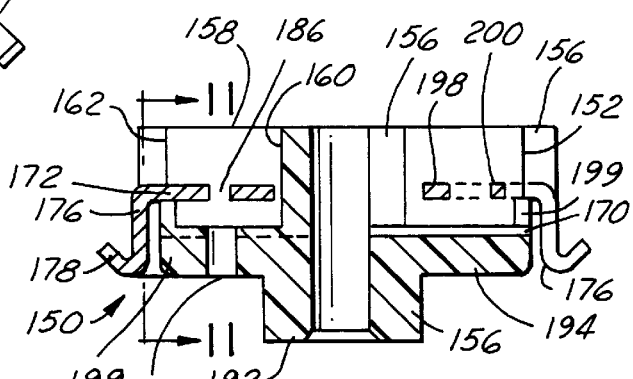
FIG. 10 is a sectional view taken along line 10—10 in FIG. 9 of the modified commutator.
Figure 11:
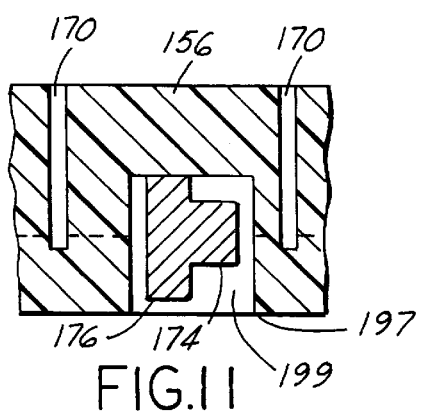
FIG. 11 is an enlarged, fragmentary, arcuate cross-sectional view along line 11—11 of FIG. 10.
Figure 12:
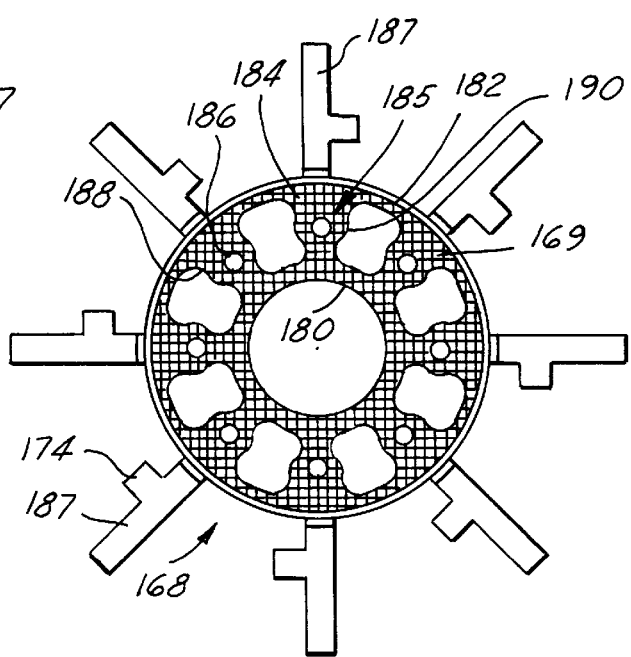
FIG. 12 is an end view of a conductor ring utilized in making the modified commutator of FIG. 9.
Figure 13:
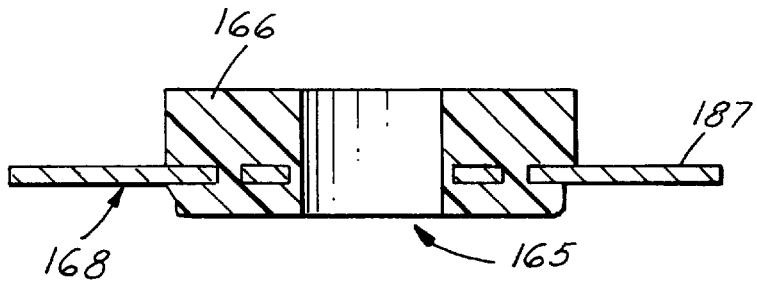
FIG. 13 is a sectional view of a subassembly of a carbon ring and conductor ring used in making the modified commutator of FIG. 9.

FIGS. 9–15 illustrate a modified commutator 150 embodying this invention. As shown in FIGS. 9 and 10, commutator 150 has a circumferential array of a plurality of individual sintered carbon segments 152 permanently mounted and fixed in a housing 156. Each carbon segment 152 has a generally trapezoidal or pie shaped configuration with a flat or planar brush contacting surface 158, generally arcuate inner and outer walls 160, 162, and planar side walls 164. Each segment 152 also has an electrical conductor 154 with a generally flat base plate 172, which extends preferably radially from the side of the carbon segment 152. An upstanding tang 176 extends from the radially outward edge of each base plate 172. Each tang terminates in a generally U-shape hook 178 that provides a connection for an armature coil lead wire. As shown in FIGS. 11 and 12, welding electrode flags 174 extend from the sides of the tangs 176. As is common in the assembly of electric motors, the welding electrode flags 174 are used to complete electric circuits through the tangs 176 and weld armature lead wires to the tangs.

Commutator 150 is made by molding powdered carbon material around a stamped one-piece copper conductor ring 168 and sintering the carbon at an elevated temperature to form a subassembly 165 (shown in FIG. 13) of a one-piece sintered carbon ring 166 with the one-piece conductor ring 168 embedded therein. The sintering is preferably done in a controlled atmosphere to control oxidation of the copper conductor ring 168. The preferred carbon material for carbon ring 166, as for carbon ring 110, is predominately natural graphite having a high purity, or low ash content, and a high crystalline level. Similarly, the preferred binder material is typically a phenol-formaldehyde resin, comprising about 5% to about 30% by weight of the carbon-binder mixture, which can be carbonized during sintering to make the resin more electrically conductive, make the ring more durable, and make it less susceptible to degradation by hydrocarbon fuels. The alloy of the conductor ring 168 is selected to maintain strength, conductivity and ductility following the elevated sintering temperatures. Suitable alloys are beryllium-copper alloy C 17400 and copper alloy C 19400.

The conductor ring 168 is formed, as best shown in FIG. 12, as a one-piece stamping with concentric inner and outer annular portions 180, 182. Typically the ring has a nominal thickness of about 0.040 of an inch. The inner and outer portions of the ring 168 are interconnected by radial spokes 184 with holes 186 formed therein and openings 188 between the spokes and the inner annular portions 180 and outer annular portions 182. The holes 186 in the radial spokes 184 are constructed to promote flow of the carbon powder during the molding process, and to help to mechanically interlock and anchor conductor ring 168 within the carbon ring 166. As shown in FIG. 12, the top surface 169 of conductor ring 168 (and also its bottom surface) is textured, preferably during progressive stamping, to further anchor the conductor ring 168 within the carbon ring 166. The surfaces of the conductor ring 168 could also be textured by rolling, forming and other conventional processes.

Spokes 184 have generally outwardly arcuate edges 190 that define bulges 185 in the center of each spoke 184 where holes 186 are located. This facilitates punching the holes 186 therethrough without bending or destroying the conductor ring 168. The outer portions 187 of radial spokes 184, which extend from the outer annular portion 182 of conductor ring 168, are subsequently formed to provide tangs 176, ending in connector hooks 178, to which armature lead wires are attached. Welding electrode flags 174 extend from the sides of the outer ends 187 of the radial spokes 184, and from the sides of the formed tangs 176. As is common in the assembly of electrical motors, the welding electrode flags 174 are used to complete electrical circuits and weld armature lead wires to the tangs.

Subassembly 165 is produced by forming a layer of the powdered carbon material and binder in a powder compacting mold (not shown), placing the conductor ring 168 above the layer of carbon and binder, forming an upper layer of carbon and binder above the conductor ring and compressing both layers, typically at pressures of about 5 to 20 tons/sq.in. to compress and density the carbon/conductor ring subassembly 165. The subassembly is then placed in an oven (not shown) where it is sintered at an elevated temperature, preferably above about 1,000° F., and even more preferably between about 1,400° F. and about 1,500° F. Sintering is conducted in a controlled atmosphere to control oxidation of the conductor ring 168.

Figure 15:
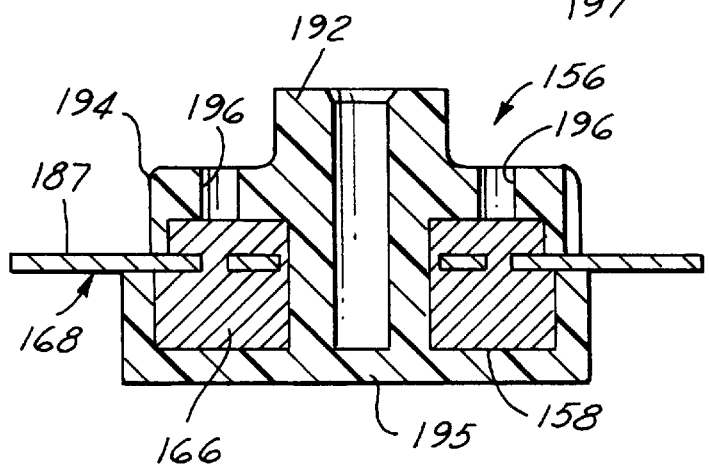
FIG. 15 is a cross-sectional view taken along line 15—15 in FIG. 14.

Subassembly 165 is then placed in another mold (not shown), preferably an injection mold, and a housing 156 of an insulating material such as a phenolic resin is formed around the subassembly. Housing 156 has a central hub 192 and an integral flange 194 underlying and supporting the carbon ring 166 and conductor ring 168. Preferably, as shown in FIG. 15, a layer of plastic 195 is molded over the brush contacting face 158 of the carbon ring 166 to protect the carbon material during the molding process and during subsequent forming of the tangs 176 and welding electrode flags 174 extending from the sides of the tangs. Pins in the injection molding die bear on the carbon/conductor ring subassembly 165 to position the subassembly 165 within the housing 156 during the molding process. The pins leave openings 196 through the housing 156 as shown in FIGS. 10 and 15.

Figure 14:
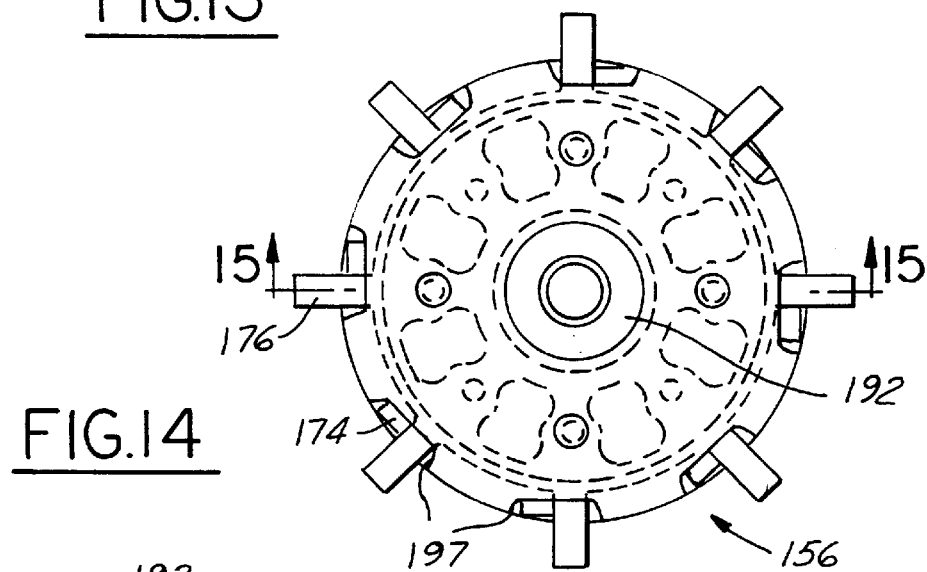
FIG. 14 is an end view of the subassembly shown in FIG. 13 with an insulating housing.

The coated subassembly shown in FIGS. 14 and 15 is placed in a fixture and, as described above, the outer ends 187 of the radial spokes 184 are formed to provide the tangs 176 and connector hooks 178 to which armature coil lead wires are connected. As illustrated in FIGS. 10, 11 and 14, tangs 178 and welding electrode flags 174 are formed into recesses 197 in the sidewall of housing 156. As best seen in FIG. 11, the inner surface of each recess 197 is formed by a recessed wall 199. This separates the tangs 176 and welding electrodes flags 174 from the carbon segments 152 and prevents direct electrical contact between the welding electrode flags 174 and carbon segments 152 while armature lead wires are being welded to the tangs 178.

After the tangs and welding electrode flags have been formed as shown in FIGS. 9–11, the layer of plastic 195 is then machined away or otherwise removed from the brush contacting surface 158 of the carbon ring 166, and a plurality of equally circumferentially spaced radial grooves 170 are cut through the carbon and conductor rings 166, 168 to form the individual sintered carbon segments 152. Preferably, the commutator 150 is mounted in and supported by a collet which bears on the outside diameter of the axially extending outer wall of the assembly while the radial grooves 170 are cut.

Grooves 170 extend completely through the carbon ring 166, completely through the conductor ring 168 and into housing 156 as best shown in FIGS. 10 and 11. Each conductor 154 is permanently fixed to housing 156, and has a tang positioned for connection of an armature wire. Each carbon segment 152 and each conductor 154 is electrically isolated from the other segments and their conductors. The housing 156 in cooperation with each carbon segment 152 embeds and encapsulates each conductor 154 between them so that in the grooves 170 between adjacent carbon segments 152 only a small area of the cross members 198, 200 of the plate formed by the inner and outer annular portions 180, 182 of the conductor ring 168 is exposed to liquid fuel in use of the commutator 150. The radial extent of each conductor 154 exposed in the groove 170 is desirably less than one-half and preferably less than one-third of the radial extent of the groove through the carbon ring. In the groove 170, the exposed surface area of the conductor is desirably less than one-third and preferably less than one-sixth of the surface area of its associated carbon segment in the groove.

The completed commutator 150 is assembled on the armature 42 and used in the pump 20 in essentially the same manner as the commutator 50 and hence the assembly and use of the modified commutator 150 will not be repeated herein.

The modified commutator 150 does not have the integral upstanding attachment prongs 74 as does the commutator 50 and instead has the openings 186 through the conductor ring 168 to anchor the conductor ring 168 within the carbon ring 166. The modified commutator 150 is easier to assemble, provides an improved interface between the carbon ring 166 and conductor ring 168 and is thus, more reliable and durable in use.

As those skilled in commutator design or production will readily appreciate from the foregoing description, this invention provides both a simple, economical design and a flexible, economical manufacturing method. Both the design and the manufacturing method may be readily adapted to take maximum advantage of different construction materials, or to adapt the illustrated designs to other applications. Sintering the carbon ring around the conductor ring before molding the housing to the carbon/conductor subassembly allows applicants to use optimal sintering temperatures that carbonize the binding materials used in the carbon molding mixture, and thereby improve conductivity, without degrading the plastic housing. The process described herein also avoids certain other problems associated with prior art attempts to manufacture carbon segment commutators, including machining, plating of the carbon, cleaning of solder and the like. Commutators embodying or produced in accordance with this invention have a high mechanical strength and stability, low electrical resistance, and can be manufactured and assembled economically. They are reliable and have a long useful life in various environments, including hydrocarbon fuels which rapidly degrade many other types of commutators.

Of course, those skilled in the art will also appreciate that many modifications may be made to the designs and manufacturing methods disclosed herein within the scope of this invention, which is defined by the following claims:

What is claimed is:

1. A commutator for an electric motor of a fuel pump which comprises:

an annular ring of sintered carbon having a planar front face and a back face, a conductor ring embedded in the carbon ring between and spaced from the front and back faces of the carbon ring prior to sintering the carbon ring and having a plurality of circumferentially spaced apart tangs adjacent the outer periphery of the carbon ring forming electrical connectors and a plurality of mounting projections which are circumferentially spaced apart, disposed radially inward of the tangs and project generally axial outwardly of the back face of the carbon ring, the conductor ring being securely attached to and bonded in the carbon ring by sintering of the carbon ring and its tangs electrically connected with the carbon ring, a housing of an electrically insulating plastic material molded over the back face of the carbon ring after sintering of the carbon ring and with the mounting projections of the conductor ring embedded and interlocked in the housing, the housing having a bore coaxial with the carbon ring, and a plurality of equally circumferentially spaced apart grooves extending radially and axially completely through the carbon ring and the metal conductor ring and forming a plurality of spaced apart separate sintered carbon segments each with a separate electrical conductor embedded and bonded therein by sintering to serve as commutator segments for contact with brushes with the grooves being formed only after the carbon ring has been sintered and after the housing has been molded onto the back face of the carbon ring to permanently fix and secure each of the carbon segments to the housing.

2. The commutator of claim 1 wherein a portion of the conductor ring is exposed in each groove and the radial extent of the exposed portion of the conductor ring is less than one half of the radial extent of the groove through the carbon ring.

3. The commutator of claim 1 wherein a portion of the conductor ring is exposed in each radial groove and the exposed portion has a surface area which is less than one-third of the surface area of the face of the carbon ring in the groove in which the conductor ring is exposed.

4. The commutator of claim 1 wherein the housing has an integral annular portion projecting into and bearing on the side wall of a central opening through the carbon ring.

5. The commutator of claim 1 wherein the conductor ring has circumferentially spaced through openings defining in part between them radially extending segments embedded in and bonded to the carbon ring.

6. A commutator for an electric motor of a fuel pump which comprises:

an annular ring of sintered carbon having a planar front face and a back face, a conductor ring embedded within the carbon ring between and spaced from the front and back faces of the carbon ring prior to sintering the carbon ring and having a plurality of circumferentially spaced apart tangs adjacent the outer periphery of the carbon ring, said conductor ring being securely attached and bonded to the carbon ring by sintering of the carbon ring with its tangs electrically connected with the sintered carbon ring, a housing of an electrically insulating plastic material molded over at least the back face of the sintered carbon ring after sintering of the carbon ring with the conductor ring embedded therein, the housing having a bore coaxial with the carbon ring, and a plurality of equally circumferentially spaced apart grooves extending radially and axially completely through the sintered carbon ring and the conductor ring and forming a plurality of spaced apart separate sintered carbon segments each with a separate electrical conductor embedded and bonded therein by sintering, to serve as commutator segments for contact with brushes with the grooves being formed only after the housing has been molded onto the sintered carbon ring to permanently fix and secure each of the carbon segments to the housing.

7. The commutator of claim 6 which also comprises circumferentially spaced openings through the conductor ring defining in part between them radially extending spokes embedded in the carbon ring.

8. The commutator of claim 7 wherein the radial spokes have generally outward arcuate edges that define bulges in the spokes, and through holes are located in the area of said bulges, and the sintered carbon of the carbon ring extends through said holes through said spokes.

9. The commutator of claim 6 wherein the housing is molded over the peripheral outside surface of the carbon ring between the front face and back faces as well as over the back face.

10. The commutator of claim 6 wherein a portion of the conductor ring is exposed in each groove and the radial extent of the exposed portion of the conductor ring is less than one half of the radial extent of the groove through the carbon ring.

11. The commutator of claim 6 wherein a portion of the conductor ring is exposed in each radial groove and the exposed portion has a surface area which is less than one-third of the surface area of the face of the carbon ring in the groove in which the conductor ring is exposed.

12. The commutator of claim 6 wherein the housing has an integral annular portion projecting into and bearing on the side wall of a central opening through the carbon ring.

13. The commutator of claim 6 wherein at least part of the portion of the conductor ring embedded within the carbon ring has a textured surface bonded to the carbon ring by sintering.

14. The commutator of claim 6 wherein the housing has an integral outer sidewall molded over and bearing on the outer peripheral wall of the sintered carbon ring with the tang of the conductor ring embedded in and extending through the outer wall of the housing.

15. The commutator of claim 14 wherein the outer sidewall of the housing has a plurality of circumferentially spaced apart recesses and part of each tang of the conductor ring is received in an associated one of the recesses.

16. The commutator of claim 14 wherein the housing has an integral inner annular sidewall projecting into and bearing on the sidewall of a central opening through the carbon ring.

* * * * *